United States Patent Office 3,833,525
Patented Sept. 3, 1974

3,833,525
PHENOLIC BLOCKED ISOCYANATE COMPOSITIONS CONTAINING A HETEROCYCLIC NITROGEN CATALYST
Charles M. Orlando, Schenectady, and Carl M. Emerick, Mechanicville, N.Y., and Robert A. Jerussi, Fairfax, Va., assignors to General Electric Company
No Drawing. Original application Apr. 23, 1971, Ser. No. 137,022, now Patent No. 3,764,375. Divided and this application June 20, 1973, Ser. No. 371,827
Int. Cl. C08g 22/32, 22/36, 22/44
U.S. Cl. 260—2.5 AC                    10 Claims

ABSTRACT OF THE DISCLOSURE

One package pourable polyurethane compositions convertible to the non-pourable state at temperatures above 70° C. are provided, utilizing a polyfunctional arylurethane, a hydroxy containing organic polymer and a nitrogen containing heterocyclic catalyst, such as imidazole. The polyurethane compositions are useful as wire enamels, coating compositions, etc., and can be converted to foams. A wire coating method is also provided.

---

This is a division of application Ser. No. 137,022, filed Apr. 23, 1971, now U.S. Pat. No. 3,764,375.

The present invention relates to one package polyurethane compositions convertible to the non-flowable state at temperatures above 70° C.

Prior to the present invention, polyurethane compositions were employed extensively in making polyurethane foams, coating compounds, wire enamels, etc. Based on the principles of polyurethane chemistry, contact between polyisocyanate, such as toluene diisocyanate, and hydroxy containing organic polymers, such as polyester, polyethylene glycols, etc., can provide polyurethane elastomers, foams, coating compositions, wire enamels, etc., depending upon the functionality of either, or both of the polyisocyanate, and the hydroxy containing organic polymer. In order to provide one package polyurethane compositions having desirable shelf life at room temperature, it has been necessary to chain stop either the hydroxy containing organic polymer, or the polyisocyanate since reaction can occur upon direct contact of these ingredients at room temperature.

One method of preventing room temperature cure between the polyisocyanate and the hydroxy containing organic polymer is to substitute a polyfunctional arylurethane, such as a phenol blocked polyisocyanate for the polyisocyanate. It has been found that one package polyurethane mixtures containing polyfunctional arylurethane and hydroxy containing organic polymer generally have to be heated to a temperature above 150° C to unblock the phenol from the polyfunctional arylurethane, allowing for interaction between the resulting polyisocyanate and the hydroxy containing organic polymer. As a result of these high temperature requirements, the use of such one package polyurethane mixtures is not suitable for making polyurethane foams, which can depend upon the use of a volatile blowing agent. Although temperature requirements as high as 400° C. have qualified these one package mixtures for wire coating applications, the rapid cure necessary to maintain suitable wire running speeds has significantly increased material cost due to the use of mixtures having high amounts of the polyfunctional arylurethane.

The present invention is based on the discovery that certain nitrogen containing heterocyclic, such as imidazole, can be employed in one package polyurethane formulations containing arylurethane, to promote the release of the arylol terminator from the polyfunctional arylurethane. As as result, pourable one package poly urethane formulations are provided which can be converted to the non-pourable state at tempreatures as low as 70° C.

There is provided by the present invention, one package pourable polyurethane compositions convertible to the non-pourable state at temperatures above 70° C., comprising (A) —OH containing organic polymer (B) polyfunctional arylurethane and (C) from 0.1% to 10% by weight of (B) a nitrogen containing heterocyclic having the characteristic structural unit, (1) 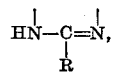

where (B) is employed in said one package pourable polyurethane compositions in an amount necessary to provide a proportion of NCO radicals, which is at least sufficient to produce an NCO/OH ratio having a value of from 0.40 to 1.6, and R is a monovalent radical selected from hydrogen and hydrocarbon radicals.

Included by the polyfunctional arylurethanes which can be employed in the practice of the invention are compounds included by the formula,

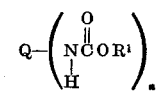

where $a$ is an integer having a vaule of fro m2 to 4 inclusive, Q is a polyvalent organo radical selected from polyarylene, and polyvalent radicals selected from the class consisting of,

(3) 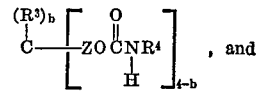

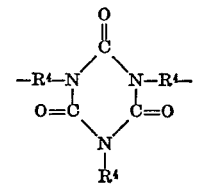

where $b$ is a whole number having a value of from 0 to 2 inclusive, Z is a divalent aliphatic radical free of peroxide linkages which can be joined to

by a carbon-carbon bond, or when $b$ has a value of 1 or 2, a carbon-oxygen bond, and is a member selected from alkylene, polyalkylene ether, and polyester, $R^1$ is an aryl radical, $R^2$ is an arylene radical, Y is a member selected from

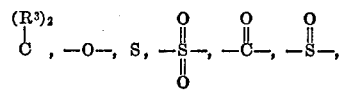

$R^3$ is a monovalent radical selected from hydrogen, alkyl radicals, and aryl radicals, and $R^4$ is an arylene radical.

Radicals included by R of Formula 1 are, for example, hydrogen, hydroxy, aryl radicals such as phenyl, naphthyl, anthryl; alkyl radicals such as methyl, ethyl, propyl, butyl, etc. Included by $R^1$ are aryl radicals such as phenyl, naphthyl, anthryl, etc. Radicals included by Q are polyarylene radicals, phenylene, naphthylene, anthylene, and

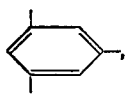

etc.; divalent organo radicals shown by

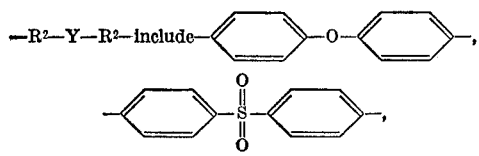

etc. In addition, Q radicals are defined by Formula 7 below. Radicals included by $R^3$ are hydrogen, phenyl, methyl, etc. Included by Z, are alkylene radicals, for example, methylene, dimethylene, trimethylene, etc.; polyalkylene ether radicals such as $(CH_2CH_2O)_x$;

$$(CH_2CH_2CH_2O)_y$$

mixtures of such alkylene ether radicals, etc., where $x$ and $y$ are positive integers; polyester radicals derived from aliphatic dicarboxylic acids such as adipic acid utilized in combination with glycols, such as ethylene glycol, glycerol, and mixtures thereof, etc.; radicals included by $R^4$ are arylene radicals included by $R^2$ as previously defined.

Included by the nitrogen containing heterocyclic compounds having the characteristic structural unit of Formula 1, are for example, imidazoles having the formula,

where $R^5$ and $R^6$ are the same or different and selected from R radicals as previously defined. There are included by the imidazoles of Formula 5, imidazole, 2-methyl-imidazole, 2 - undecyl-imidazole, 2 - phenyl-imidazole, 4 - phenyl-imidazole, 2 - ethyl-4-methyl-imidazole, 2-hydroxy-imidazole, 2,4,5-triphenyl-imidazole, etc.

In addition to the above imidazoles, there also are included under Formula 1, triazoles of the formula,

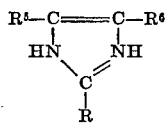

such as 1,2,4-triazole, 3-methyl-1,2,4-triazole, 3-phenyl-1,2,4-triazole, etc., where $R^7$ is selected from R radicals.

Further examples of heterocyclic nitrogen compounds which can be employed in the practice of the invention are imidazoles having the structural unit of Formula 1 fused to an aromatic ring such as benzimidazole, 1,2-naphthimidazole, 2,3-naphthimidazole, and 9,10-phenanthrimidazole.

Among the preferred polyfunctional arylurethanes included by Formula 2, are compounds included by the formula, (7) 

where $R^3$, $R^4$, Z and $b$ are as previously defined, and $R^8$ is a divalent hydrocarbon radical. Some of the compounds of Formula 7 can be made by effecting reaction between a polyol, such as trimethylol propane and a difunctional isocyanate, such as 2,4-toluene diisocyanate, and an aromatic hydroxy compound such as, phenol, naphthol, etc. Polyarylurethanes included by Formula 7 are for example,

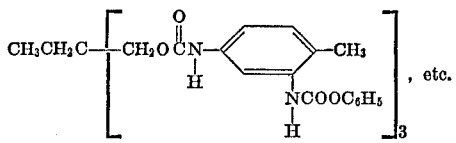, etc.

In addition to the compounds of Formula 7, other polyfunctional urethanes included by Formula 2 are,

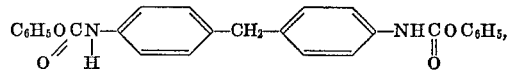

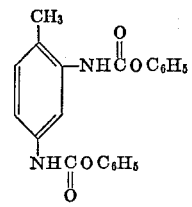

In addition to the above described one package polyurethane compositions, there also is provided by the present invention a wire coating method involving the steps of, (1) Passing wire through a polyurethane composition comprising (D) a polyfunctional arylurethane and (E) hydroxy containing organic polymer, (2) Passing the resulting coated wire through a heating zone at a temperature between 200° C. and 550° C., and at a speed sufficient to effect a suitable cure of the polyurethane composition on the surface of the wire, which wire coating method involves the improvement of utilizing in the polyurethane composition of Step 1, an effective amount of a nitrogen containing heterocyclic having the structural unit of Formula 1 above to permit the passage of wire through said heating zone of Step 2 at a significantly improved rate of speed, while effecting at least a substantially equivalent cure of the polyurethane composition on the surface of the wire, where (D) is utilized in said polyurethane composition in an amount sufficient to provide an NCO/OH ratio of from 0.4 to 1.2 and is a compound selected from,

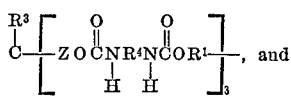, and and

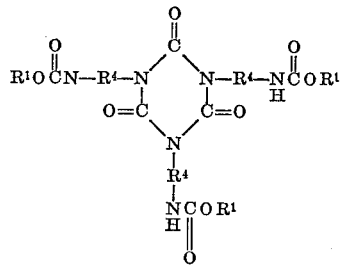

where $R^3$, Z and $R^4$ are as previously defined.

Included by the hydroxy containing organic polymers of the present invention are, for example, hydroxy containing polyesters which can be linear or branched. They can be produced by effecting reaction between a polycarboxylic acid and a polyglycol. Some of the polycarboxylic acids, which can be employed in making the polyesters are oxalic acid, malonic acid, succinic acid, glutaric acid, adipic acid, palmitic acid, suberic acid, azelaic acid, sebacic acid, phthalic acid, isophthalic acid, terephthalic acid, halogenated phthalic acid, dicarboxylic acid reaction products of organic diamine, such as m-phenylene diamine or methylene dianiline and trimellitic anhydride, etc. Glycols which can be employed to make the hydroxy containing polyesters utilized in the practice of the invention include 1,4-butanediol, 1,4-cyclohexanecarbinol, ethylene glycol, diethylene glycol, triethylene glycol, etc.; propylene glycol, 1,3-butylene glycol, 1,4-butylene glycol. Mixtures of glycols and triols, such as glycerine, 1,2,6-hexanetriol, trimethylolpropane, pentaerythritol, tris(2-hydroxyethyl) isocyanurate, etc., also can be employed in combination with any one or more of the aforementioned acids. Esterification and transesterification methods for making these polyesters are well known. A method which can be employed for example, is described on pages 45–49 of *"Polyurethanes Chemistry and Technology,"* J. H. Saunders and K. C. Fritch, Interscience Publishers, New York (1962).

Also included by the hydroxy containing organic polymers are polyols which are taught on pages 32–44 of *"Polyurethanes Chemistry and Technology,"* J. H. Saunders and K. C. Fritch, Interscience Publishers, New York (1962). Polyols which can be employed can be made from source materials, such as ethylene oxide, propylene oxide, epichlorohydrin, tetrahydrofuran, etc. For example, one procedure which can be used is to effect reaction between propylene oxide, epichlorohydrin, etc., and an alkylene glycol, such as propylene glycol, or a fluorinated alkylene glycol in the presence of a base catalyst, such as anhydrous sodium hydroxide; polyglycols having a molecular weight of between 300 and 12,000 and preferably, 1,000 to 2,000 can be utilized.

The one package pourable polyurethane compositions of the present invention can be made by mixing together the polyfunctional arylurethane, the hydroxy containing organic polymer and the nitrogen containing heterocyclic utilizing the proportions as previously defined. Depending upon the application to which the one package polyurethane composition is to be employed such as a wire coating enamel, a surface coating formulation, or a foam composition, the proportions of the components in a mixture can vary to achieve the optimum NCO/OH ratio in each instance. In particular instances, there also can be utilized in the mixture a suitable organic solvent, fillers, etc. The resulting formulation can have a viscosity of from 1 to 100,000 centipoises at 25° C. which for purposes of definition will signify the pourable state of the composition. Viscosities greater than 100,000 centipoises at 25° C. will signify the non-pourable state.

In preparing the one package polyurethane wire coating formulation, sufficient polyfunctional arylurethane should be employed in combination with the hydroxy containing organic polymer to provide for an NCO/OH ratio of from about 0.4 to about 1.2 and preferably from 0.65 to 1.05. The hydroxy containing organic polymer can be branched or linear and have a hydroxy number in the range of between 300–500, and preferably 390–420. The use of an organic solvent is generally required because the formulation must have a viscosity suitable for a high speed wire coating formulation. Suitable organic solvents which can be employed include organic solvents which are inert to the components of the mixture, and which can provide for a wire coating enamel having a viscosity in the range of between about 20 centipoises to 2000 centipoises at 25° C. Included among the organic solvents which can be employed are, for example, cresylic acid, phenol, naphtha, xylene, etc. The resulting formulation can have a solids content in the range of about 20% to about 35% by weight of the mixture. In addition, standard wire coating enamels, such as polyvinyl formal, phenol formaldehyde resins and mixtures thereof can be employed in amounts up to 10% by weight.

Depending upon such factors as the NCO/OH ratio, the temperature employed for curing the enamel, the wire running speed, etc., the proportions of nitrogen containing heterocyclic can vary widely in the mixture. For example, wire which can have an AWG size in the range of from 32–56, can be coated at speeds of from 150 to 500 feet per minute at temperatures in the range of about 350° C., while speeds as high as 2,500 feet per minute can be employed in temperatures as high as 550° C. Those skilled in the art will be able to determine, depending upon the choice of wire diameter, speed and temperature, etc., the proportions of imidazole which are to be employed in the mixture.

To determine whether the enamel has been properly cured, it can be tested for overcure with the wire solderability test, or undercure with the organic solvent swelling test. Other tests such as examination for crazing under a microscope after the coated wire has been snapped can be used for fine wire such as GE E18B5A. The solderability test involves immersing the enameled wire into a solder bath at 400° C., for 5 seconds or less, to determine whether at least 80% of the immersed wire can be wetted by the solder after the wire has been removed. In instances where the wire has been overcured it will fail the test. There also can be employed the wire swelling test, specifically GE E18C2–S1, which involves the immersion of the wire into a 70/30 mixture of ethanol-toluene for a period of 5 minutes while the mixture is at reflux. If the wire has been sufficiently cured there should be no visible swelling or blistering of the wire coating, except at the cut end.

Another application to which the one package polyurethane mixtures can be employed is in making polyurethane foams requiring a volatile blowing agent. Included by the blowing agents which can be utilized are, for example, Freon 11, Freon 113, etc. Cure of the one package polyurethane foam formulation occurs during the blowing operation. Experience has shown that an NCO/OH ratio of 1 to 1.6 will provide for effective results, while a ratio of 1.3 to 1.5 is preferred. An effective amount of nitrogen containing heterocyclic based on the weight of the arylurethane, is from about 5% to 10%. Experience has shown that hydroxy containing organic polymer which is employed can have a hydroxy number of from 400 to 500, while a hydroxy number of from 400 to 485 is preferred.

In addition to the above described wire coating enamel and foam formulations, the one package polyurethane compositions of the invention can also be employed as surface coating compounds for various substrates. It has been found that an NCO/OH ratio of 0.8 to 1.3 can be employed in the formulation, while a preferred ratio is from 0.9 to 1.1. The hydroxy containing organic polymer, such as a polyglycol or a polyester polyol, can have a hydroxy number in the range of from 300–500, and preferably 370–425. Again the amount of imidazole utilized in such formulations will be based on the requirements of the fabricators, who can best determine the proportions which are necessary.

The one package polyurethane formulations of the invention can be reinforced with various fillers, such as silica filler, finely divided quartz, and diatomaceous earth, etc. In addition, fibrous fillers such as glass fiber, carbon fiber, carbon whiskers, also can be utilized. A filler proportion of from 5 to 15% by weight of the resulting polyurethane formulation can be employed.

In order that those skilled in the art will be better able to practice the invention, the following examples are given by way of illustration and not by way of limitation. All parts are by weight.

EXAMPLE 1

There was added 624 parts of a polyphenylurethane having the formula,

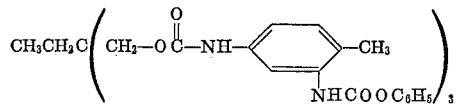

to 664.8 parts of cresylic acid at a temperature of 85° C., while the cresylic acid was being stirred. The mixture was stirred until the polyphenylurethane was dissolved. The mixture was then cooled to 50° C. and there was added 412.5 parts of a wire enamel mixture, consisting essentially of a mixture of a polyvinylformal and a phenol formaldehyde resin at a 40% solids level.

There was then added to the above mixture, 294.6 parts of a polyester polyol reaction product of ethylene glycol, trimethylolpropane, triethylene glycol, and phthalic acid anhydride, having a hydroxy number of about 390–420 and a solution viscosity at 70% solids in methyl Cellosolve acetate of between about 800–1100 centipoises at 20° C. The resulting mixture had an NCO/OH ratio of about 0.9 and a solids content of about 27%. The mixture was stirred until the various ingredients were uniformly dispersed. There was then added 1004 parts of Solvesso 100. The resulting mixture was then filtered under pressure through a 2 micron filter paper. The mixture was then divided into two equal parts. There was added to one of the parts, 3.12 parts of imidazole. Both mixtures were then thoroughly blended on a roll mill.

The above mixtures were employed as wire coating enamels for 36 AWG copper wire using a MAG machine operated at an oven temperature of 375° C. It was found that the wire coating enamel, free of imidazole, could not be employed for coating wire above a speed of about 200 feet per minute. The wire did not pass GE E18B5A snap elongation test. Above 200 feet per minute the wire showed cracks and crazing indicating undercure. The wire coating enamel containing the imidazole passed the aforedescribed snap elongation test at speeds as high as 275 feet per minute. The imidazole containing wire formulation also passed the solderability test showing a 90% solderability after immersion of less than 5 seconds in hot solder at about 400° C.

EXAMPLE 2

There was added 885 parts of the polyarylurethane employed in Example 1 to 1034 parts of cresylic acid at 85° C. The mixture was stirred until the ingredients were all dissolved. The mixture was then allowed to cool to 50° C. and 780 parts of the wire enamel resin utilized in Example 1 was added, and 555 parts of the polyester polyol. There was then added to the mixture 1600 parts of Solvesso. The final enamel was then filtered through a 2 micron filter paper under pressure. The resulting formulation contained 25% by weight less of the polyarylurethane and had an NCO/OH ratio of 0.7.

The above formulation was then divided into two equal parts. There was then added to one of the parts, 1% by weight of imidazole based on the weight of the polyarylurethane in the formulation. The wire enamels were then employed to coat 20 AWG copper wire at a speed between 30 feet per minute and 41 feet per minute. Even though the imidazole containing formulation had 25% by weight less of the polyarylurethane as compared to the wire enamel of Example 1, it was found that it was useful in producing coated copper wire at speeds between 31 to 41 feet per minute, which passed the above described solvent resistance test and the solderability test. The wire enamel free of imidazole, however, could not be employed to produce copper wire at speeds above 33 feet per minute, which passed the solvent resistance test indicating that the enamel was undercured.

EXAMPLE 3

A solution was prepared of 3.62 parts of a phenol adduct of 2,4-toluene diisocyanate, 2.8 parts of a polyester polyol having a hydroxy number of between 390–420, and a viscosity of about 800 to 1100 centipoises at about 25° C. Based on method of preparation the resulting formulation had an NCO/OH ratio of about 1. The solution was divided into two equal parts and to one of these parts there was added 0.09 part of imidazole in 10 parts of cresylic acid.

Both of the above mixtures were applied to the surface of a glass plate using a 0.003 inch applicator. The plates were then placed in a vacuum oven at 160° C. at 25 mm. for 60 minutes. The plates were then removed from the oven and allowed to cool to room temperature. The plate which was surface coated with the composition containing the imidazole was found to resist the effects of a mixture of 70 parts of ethanol and 30 parts of toluene after immersion for 10 minutes. The plate treated with the mixture free of imidazole was found to be substantially free of surface coating, having readily dissolved after immersion under the same conditions. Those skilled in the art would know that the surface coating compositions containing the imidazole would be useful in treating glass substrates to improve the abrasion resistance of such substrates, while exhibiting substantial resistance to the effects of organic solvents.

EXAMPLE 4

There was added 3.76 parts of phenol to a reaction product of 10½ parts of toluene diisocyanate and 5.15 parts of a polyether polyol, having a hydroxy number of about 475 dissolved in about 100 parts of chloroform. The resulting mixture was then stirred and refluxed for about 12 hours.

To the above described phenylarylurethane there was added 0.15 part of a polydimethyl siloxane fluid, 0.2 part of water, and 2.55 parts of the above polyether polyol. Based on method of preparation the resulting formulation had an NCO/OH ratio of about 1.43.

The above formulation was then divided into two equal parts. There was then added to one of the parts 0.14 part of imidazole, which was stirred into the mixture. The resulting mixtures were then evaporated under reduced pressure. There was obtained an oil in both instances. The oils were dissolved in Freon-113 and the resulting solutions were heated at 100° C. for the same period of time, which was in the range of from 5–15 minutes. There was obtained a rigid foam having a uniform cell size, from the foam formulations containing the imidazole. The foam formulation free of imidazole did not produce a foam and was substantially free of cells showing that the blowing agent had completely escaped without effecting a foaming of the composition.

EXAMPLE 5

A pourable polyurethane mixture was prepared using 10 parts of a polyarylurethane shown by Formula 2, having an NCO content of 5.5% and 1.55 parts of a sucrose based polyethyleneoxide, having a hydroxy number of 475. The resulting formulation had an NCO/OH ratio of about 1. The mixture was divided into 3 equal parts. There was added to one of the parts, 10% by weight of imidazole, based on the weight of the polyarylurethane. There was added to the second part, 5% by weight of imidazole.

The three mixtures were maintained at a temperature of 85° C. to determine how long it would take to effect a change from the pourable state to the non-pourable state. It was found that the mixtures containing the 10% and 5% by weight imidazole became non-pourable after about 15 hours and 20 hours respectively. The mixture free of imidazole was found to be pourable after 72 hours, and for an indefinite period of time thereafter.

Based on these results those skilled in the art would know that the employment of imidazole in the pourable polyurethane formulations provided for mixtures which were convertible to the non-pourable state at temperatures as low as 85° C., after a period of 15 hours or less. These mixtures are valuable encapsulating materials for electronic components.

Although the above examples are limited to only a few of the very many pourable formulations included in the scope of the invention, it should be understood that the pourable compositions of the present invention include polyarylurethane, shown by Formula 2, hydroxy containing organic polymers as previously defined, and an effective amount of nitrogen containing heterocyclic having the structural unit of Formula 1.

What we claim as new and desire to secure by Letters Patent of the United States:

1. One package pourable polyurethane compositions convertible to the non-pourable state at temperatures above 70° C., comprising (A) hydroxy containing organic polymer, (B) polyfunctional arylurethane, (C) from 0.1% to 10% by weight of (B) of a nitrogen containing heterocyclic having the characteristic structural unit,

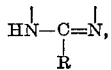

where (B) is employed in said one package pourable polyurethane compositions in an amount necessary to provide a proportion of NCO radicals, which is at least sufficient to produce an NCO/OH ratio having a value of from 0.40 to 1.6, and R is a monovalent radical selected from hydrogen, hydroxy, and hydrocarbon radicals.

2. A composition in accordance with claim 1, where the nitrogen containing heterocyclic is a compound included by the formula,

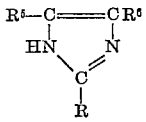

where R is as defined in claim 1, and $R^5$ and $R^6$ are the same or different and are selected from R radicals.

3. A composition in accordance with claim 1, where the nitrogen containing heterocyclic is imidazole.

4. A composition in accordance with claim 1, where the polyfunctional arylurethane is included by the formula,

where $R^1$ is an aryl radical, $R^3$ is a monovalent radical selected from hydrogen, alkyl radicals, and aryl radicals, $R^4$ is an arylene radical, and $R^8$ is a divalent hydrocarbon radical.

5. A composition in accordance with claim 4, where the polyurethane has the formula,

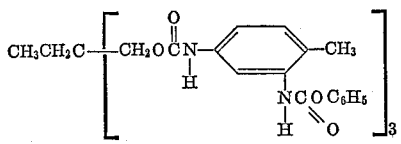

6. A surface coating composition in accordance with claim 1.

7. A wire coating enamel in accordance with claim 4.

8. A foamable mixture in accordance with claim 1.

9. A wire coating enamel in accordance with claim 1, comprising a polyarylurethane of the formula,

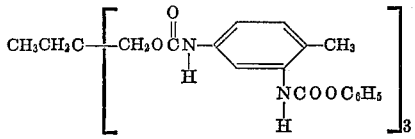

a polyester polyol having a hydroxy number of 390–420 and from 0.1% to 10% by weight of imidazole, where the wire coating enamel has an NCO/OH ratio of from 0.85 to 1.05.

10. A foamable mixture in accordance with claim 8, where the nitrogen containing heterocyclic is imidazole.

References Cited

UNITED STATES PATENTS

| | | | |
|---|---|---|---|
| 3,769,244 | 10/1973 | Hashimoto | 260—77.5 AC |
| 3,728,291 | 4/1973 | Carroll | 260—75 NC |
| 3,674,721 | 7/1972 | Aufdermarsh | 260—77.5 AC |
| 3,645,924 | 2/1972 | Fogiel | 260—77.5 AC |
| 3,448,065 | 6/1969 | Green | 260—77.5 AC |
| 3,446,779 | 5/1969 | Finelli | 260—77.5 AC |
| 3,252,945 | 5/1966 | Ugi | 260—77.5 AC |
| 3,177,223 | 4/1965 | Erner | 260—77.5 AC |
| 3,152,094 | 10/1964 | Erner | 260—2.5 AC |
| 3,745,138 | 7/1973 | Koerner, et al. | 260—77.5 TB |
| 3,740,377 | 6/1973 | Huffman | 260—77.5 AC |
| 3,723,372 | 3/1973 | Wakimoto | 260—77.5 TB |
| 3,721,645 | 3/1973 | Zemlin | 260—77.5 TB |
| 3,676,402 | 7/1972 | Matsui | 260—77.5 TB |
| 3,668,186 | 6/1972 | Duncan | 260—77.5 TB |
| 3,471,589 | 10/1969 | Rinehart | 117—232 |
| 3,252,944 | 5/1966 | Curtis | 260—77.5 TB |

FOREIGN PATENTS

| | | | |
|---|---|---|---|
| 671,038 | 9/1963 | Great Britain | 260—77.5 AC |
| 679,761 | 2/1964 | Canada | 260—77.5 TB |
| 516,294 | 9/1955 | Canada | 260—77.5 TB |

OTHER REFERENCES

Journal of Applied Polymer Science, Vol. 16 (1972), pp. 2853–2857.

DONALD E. CZAJA, Primary Examiner

C. W. IVY, Assistant Examiner

U.S. Cl. X.R.

260—75 NC, 77.5 AC, 77.5 TB